(12) United States Patent
Wolfe et al.

(10) Patent No.: US 8,208,259 B1
(45) Date of Patent: Jun. 26, 2012

(54) SYSTEM, APPARATUS AND METHOD FOR COOLING ELECTRONIC COMPONENTS

(75) Inventors: Mark Wolfe, Round Rock, TX (US); Julian Partridge, Austin, TX (US)

(73) Assignee: Augmentix Corporation, Austin, TX (US)

( * ) Notice: Subject to any disclaimer, the term of this patent is extended or adjusted under 35 U.S.C. 154(b) by 133 days.

(21) Appl. No.: 12/775,544

(22) Filed: May 7, 2010

Related U.S. Application Data

(60) Provisional application No. 61/176,751, filed on May 8, 2009.

(51) Int. Cl.
*H05K 7/20* (2006.01)

(52) U.S. Cl. ........ 361/700; 361/707; 361/714; 361/719; 361/679.52; 361/679.53; 165/104.26; 165/104.33

(58) Field of Classification Search .................. None
See application file for complete search history.

(56) References Cited

U.S. PATENT DOCUMENTS

| | | | | |
|---|---|---|---|---|
| 5,465,782 A * | 11/1995 | Sun et al. | ................. | 165/104.26 |
| 5,642,775 A * | 7/1997 | Akachi | ................. | 165/104.14 |
| 5,737,840 A * | 4/1998 | Akachi | ................. | 29/890.032 |
| 6,148,906 A * | 11/2000 | Li et al. | ................. | 165/104.33 |
| 6,873,527 B2 * | 3/2005 | Zhang et al. | ................. | 361/700 |
| 7,013,958 B2 * | 3/2006 | Garner et al. | ................. | 165/104.26 |
| 7,019,967 B2 * | 3/2006 | DiFonzo et al. | ................. | 361/679.52 |
| 7,124,809 B2 * | 10/2006 | Rosenfeld et al. | ................. | 165/104.26 |
| 7,130,193 B2 * | 10/2006 | Hirafuji et al. | ................. | 361/700 |
| 7,198,096 B2 * | 4/2007 | Parish et al. | ................. | 165/104.33 |
| 7,849,598 B2 * | 12/2010 | Hsu | ................. | 29/890.032 |
| 7,857,037 B2 * | 12/2010 | Parish et al. | ................. | 165/104.33 |
| 2005/0030719 A1 * | 2/2005 | Lin et al. | ................. | 361/719 |
| 2010/0006267 A1 * | 1/2010 | Meyer et al. | ................. | 165/104.26 |

* cited by examiner

*Primary Examiner* — Boris Chervinsky
(74) *Attorney, Agent, or Firm* — Sprinkle IP Law Group

(57) ABSTRACT

Cooling systems for computers are disclosed. In particular, embodiment of such cooling solutions may effectively be used in conjunction with mobile computers that have a polymer (or other type of) chassis. More specifically, embodiments of the present invention use micro vapor plates to conduct the heat generated by one or more electronic components of a mobile computer to the chassis of the mobile computer such that the heat from the electronic components is conducted into, and spread over, at least a portion of the surface of the chassis. The mobile computer can then be cooled by convection or radiation.

21 Claims, 18 Drawing Sheets

| | Description | Plastic (W/m*K) | Graphite/Case Interface | Enhancement | CPU | MCH (7W) | SODI MM (2.5W) | Case Plastic | HDD (2.2W) | Battery (1.5W) | Ambient [C] |
|---|---|---|---|---|---|---|---|---|---|---|---|
| Scenario 1 | Simplified Model, Plastic Case (0.2 W/m*K), heat dumped to MVPs | 0.2 | N/A | | 92 | 78 | 82 | 84 | | | 45 |
| Scenario 2 | Same as #1 except bottom of MVP exposed to outside behind vent | 0.2 | N/A | MVP exposed behind grille | 92 | 78 | 82 | 84 | | | 45 |
| Scenario 3 | Same as #1 except bottom chassis made of 10 W/m*K | 10 | N/A | | 77 | 66 | 79 | 69 | | | 45 |
| Scenario 4 | Plastic Case, 0.2 W/m*K, Graphite sheet under MVP | 0.2 | TIM 3 W/m*K | Large graphite | 79 | 70 | 81 | 70 | | | 45 |
| Scenario 4a | Same as 4 except 25 C ambient | 0.2 | TIM 3 W/m*K | Large graphite | 62 | 53 | 64 | 54 | | | 25 |
| Scenario 5 | More Detailed Model, Plastic Case, MVP, Graphite | 0.2 | TIM 3 W/m*K | Small graphite | 93 | 82 | 84 | 85 | 67 | 52 | 45 |
| Scenario 6 | Same as 5, except double walled bottom | 0.2 | TIM 3 W/m*K | SM Graph + Double wall | 85 | 75 | 82 | 70 | 63 | 50 | 45 |
| Scenario 7 | Processor MVP connected to finned heatsink in back of unit | 0.2 | PSA 0.2 W/m*K | SM Graph + Rear Ht Sink | 88 | 72 | 80 | 65 | 67 | 52 | 45 |

*FIG. 12*

SYSTEM, APPARATUS AND METHOD FOR COOLING ELECTRONIC COMPONENTS

RELATED APPLICATIONS

This application claims priority to U.S. Provisional Patent Application Ser. No. 61/176,751, by inventors Mark Wolfe and Julian Partridge, entitled "System, Apparatus and Method For Cooling Electronic Components" filed on May 8, 2009, the entire contents of which are hereby expressly incorporated by reference for all purposes.

TECHNICAL FIELD

Embodiments of the invention relate generally to electronic devices such as mobile computers. More particularly, embodiments of the invention relate to cooling solutions for use with such electronic devices. Even more specifically, certain embodiments of the invention relate to the use of micro vapor plates to remove heat from circuits utilized in such electronic devices.

BACKGROUND

With the advent of the computer age, electronic systems have become a staple of modern life, and some may even deem them a necessity. Part and parcel with this spread of technology comes an ever greater drive for more functionality from these electronic systems. A microcosm of this quest for increased functionality is the size and capacity of various semiconductor devices. From the 8 bit microprocessor of the original Apple I, through the 16 bit processors of the original IBM PC AT, to the current day, the processing power of semiconductors has grown while the size of these semiconductors has consistently been reduce. In fact, Moore's law recites that the number of transistors on a given size piece of silicon will double every 18 months.

As semiconductors have evolved into these complex systems, almost universally the connectivity and power requirements for these semiconductors have been increasing. In fact, the higher the clock frequency utilized with a semiconductor, the greater that semiconductor's power consumption (all other aspects being equal). Thus, modern electronics and computing components may run at relatively higher temperatures.

Consequently, the cooling of these high-speed electronic components has presented a problem. This problem has been exacerbated in the mobile environment, where packaging limitation and the resulting space constraints may raise further impediments to adequate cooling of electronic components utilized in such mobile devices. These problems may manifest themselves even more dramatically in the context of implementing mission critical mobile computing platforms, such as electronic components designed to be utilized by members of the armed services in combat situations or other arenas or situations where the proper operation of these electronic components is of the utmost importance. As these mission critical mobile devices may have a number of operational constrains imposed on them, including shock resistance, imperviousness to liquids, operating temperature, radiation emissions, etc. cooling electronic components of such mission critical mobile devices may be even more difficult, as necessities imposed by these other constraints (for example, sealed portions of a chassis, chassis material, etc.) may further limit the cooling solutions which may be utilized.

As it is still desired to use high-speed electronic components in these various types of electronic devices, (especially in the context of mission critical devices where processing power may provide a vital advantage), what is required are sophisticated and effective cooling solutions to remove heat from electronic components in electronic devices.

SUMMARY

Cooling systems for computers are disclosed. IN particular, embodiments of such cooling solutions may effectively be used in conjunction with mobile computers that have a polymer (or other type of) chassis. More specifically, embodiments of the present invention use micro vapor plates to conduct the heat generated by one or more electronic components of a mobile computer to the chassis of the mobile computer such that the heat from the electronic components is conducted into, and spread over, at least a portion of the surface of the chassis. The mobile computer can then be cooled by convection or radiation.

Specifically, in one embodiment, a mobile computer may comprise one or more electronic components thermally coupled to one or more micro vapor plates that are, in turn, thermally coupled to the chassis of the mobile computer such that heat from these processors may be conducted through the MVP into the chassis. Through the radiation of such heat from the chassis the processor(s) may be cooled utilizing convection.

Thus, embodiments may provide an computing device, comprising: a case, an integrated circuit board disposed within the case, a first processor on the integrated circuit board and a first micro vapor plate (MVP) thermally coupled to the first processor and a first area of the case, wherein the first MVP is oriented and shaped to conduct heat from the first processor to the first area of the case.

Other embodiments may provide a method of manufacturing such a computing device, comprising providing a case; providing an integrated circuit board disposed within the case; providing a first processor on the integrated circuit board; and thermally coupling a first micro vapor plate (MVP) to the first processor and a first area of the case, wherein the first MVP is oriented and shaped to conduct heat from the first processor to the first area of the case.

Aspects and embodiments of the invention may provide the advantages of conductive cooling and still allowing the use of certain chassis materials or designs. Thus, certain embodiments may provide a completely sealed systems with effective cooling and without the problems inherent to fan based (or certain other types of) cooling systems. Moreover, embodiment may make such computing device less expensive to purchase or manufacturer (such as by using a polymer chassis, etc.), to raise the reliability of such devices, to extend the operating capabilities (for example battery life) of such devices, to reduce the noise level of such devices, etc.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 11-14 depict the cooling efficiency of one embodiment of a cooling solution.

DETAILED DESCRIPTION

Figure 1A:
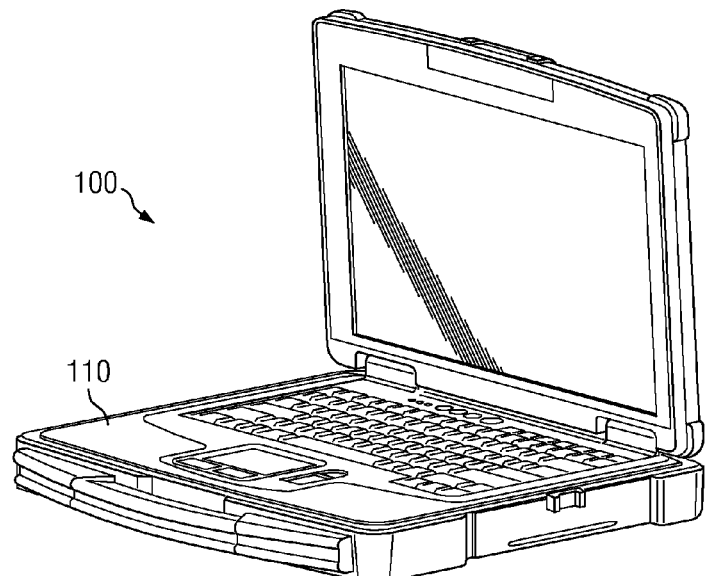
FIGS. 1A and 1B depict embodiments of a mobile computing device.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Before discussing specific embodiments a brief overview of the context of the disclosure may be helpful. As discussed above, cooling of electronic components has become increasingly difficult in a number of environments. This problem is exacerbated in the context of mobile electronic devices, such as a mobile computer, where packaging limitation and commensurate space constraints may present certain impediments and is made more difficult still when it is desired to utilize such mobile electronic devices in a mission critical setting, where a number of requirements and demands may be placed on such mobile electronic devices. Implementing mobile electronic devices for mission critical settings may therefore entail engineering and manufacturing these mobile computing devices to tolerate a variety of conditions or events and to comply with a variety of other requirements, which may include, for example, drop or impact standards, tolerance or resistance to water ingress, operating ranges (including temperature operating ranges), etc. Meeting these various standards may, however, require implementing designs or solutions which place further limitations on the types of cooling solutions which may be utilized with the mobile electronic device.

Figure 1B:
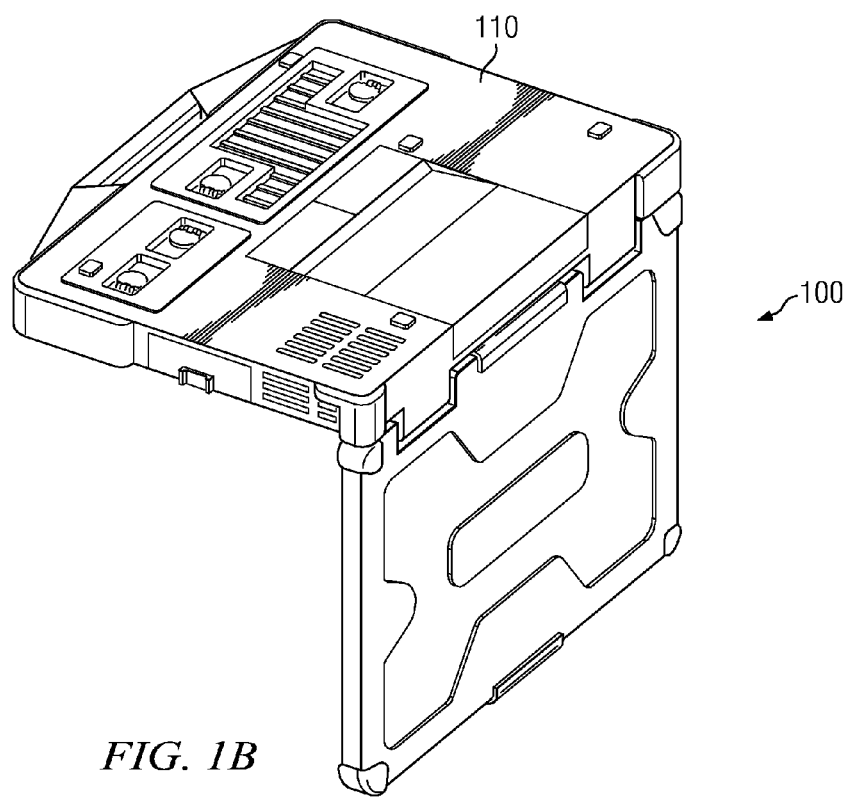

The constraints imposed, and the need for balancing between these constraints, with respect to various types of mobile electronic devices may be better understood with reference to FIGS. 1A and 1B which depict one embodiment of a mobile computing device constructed for use in a mission critical setting. Mobile computer 100 may be constructed to conform to one or more standards promulgated by a standards body or a potential user of the mobile computer 100. These standards may pertain to environmental tests designed to prove that mobile computer 100 can remain operational in a variety of conditions. These environmental tests may cover areas such as drop, vibration, shock, water resistance, altitude, high temperature, low temperature, shock, humidity, etc. Examples of such standards include those issued by the U.S. Army's Developmental Test Command, including MIL-STD-810F, MIL-STD-461E, etc.

To comply with certain of these standards then, mobile computer 100 may comprise chassis 110 constructed to isolate or protect electronic components of mobile computer 100 from shock, vibration, water, etc. Consequently chassis 110 may be at least partially sealed, of a certain thickness, constructed of a certain type of material, etc. The design of such a chassis 110 may, however, place restraints on the types of cooling solutions which may be used in conjunction with mobile computer 100.

The design of other components of mobile computer 100 may, either because of being designed to meet certain standards or for other reasons altogether, also place constraints on the types of cooling solutions which may be utilized with mobile computer 100. These types of constraints are problematic, as certain of the standards pertaining to mobile computer may pertain to operating temperature of electronic components of mobile computer 100, to an operating temperature of mobile computer 100 as a whole, to an ambient temperature range in which mobile computer must maintain functionality for a certain amount of time, etc.

Figure 2:
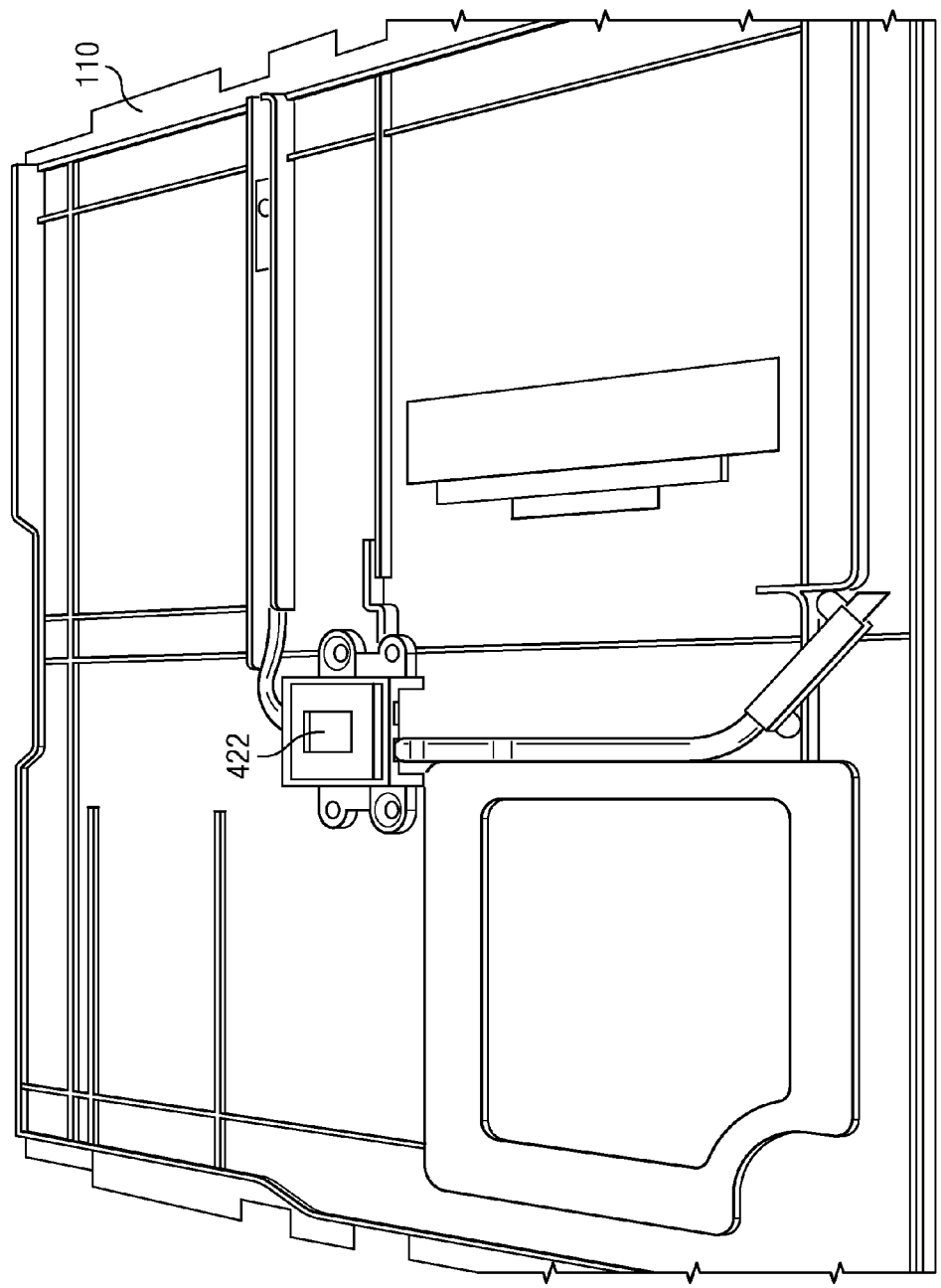
FIG. 2 depicts one embodiment of a chassis designed for a cooling solution.

To meet these standards, in conjunction with the limitations or constraints placed on the cooling solutions used by the design of components of mobile computer 100, in one embodiment conductive cooling may be utilized such that heat generated by electronic components of mobile computer 100 may be dissipated through chassis 110 to the surrounding environment using for example, standard copper heat pipes 115 and a metal chassis 110 (such as those made of magnesium, etc.). An example of a chassis which is designed for such a conductive cooling solution is depicted in FIG. 2.

Alternatively, fans may also be utilized to implement cooling solutions, such that a fan may move air onto one or more electronic components of mobile computer 100. This solution, however, requires that at least a portion of the fan be configured (e.g., vent 105 shown in FIG. 1B) to vent air external to the chassis 110 of the mobile computer, and usually requires additional hardware such as heat sinks and some conductive cooling methodology such as heat pipes or the like.

Increasingly, however, it is desired to utilize modern high-speed electronic components including microprocessors, ASICs or the like in mobile computer 100. In fact, in many cases the use of high-speed electronic components may provide vital or decisive in certain mission critical applications. These high-speed modern electronics may, however, generate a great deal more heat relative to their lower speed counterparts. Thus, previously utilized cooling solutions may prove ineffective for use with these high-speed electronic components.

Additionally, these previous cooling solutions may impose other undesirable limitations, for example the use of fans may make a mobile computer significantly more noisy, may present difficulties in sealing the chassis against water ingress (as the fan may need to vent air to an area external to the chassis, may consume more power than desirable (e.g. a fan may use on the order of 1.5 watts during operation) and may reduce the mean time between failure of components of a mobile computer, as fans have a relatively high number of moving parts.

Similarly, the use of purely conductive cooling to the chassis may dictate that the chassis be made of a significantly heat conductive metal material such as magnesium instead of a more desirable polymer alternative. The use of these metals may greatly increase the cost of manufacturer of the chassis and the mobile computer generally. Additionally, such metal materials may be brittle, increasing the complexity of meeting other standards (such as impact or drop standards,) or heavier than other alternatives.

What is desired, then, are effective cooling solutions which may be utilized with computing devices where these solutions may provide the advantages of conductive cooling and that may allow the use of certain chassis materials or designs. Specifically, it is desired that embodiments of such cooling solutions may be effectively utilized with mission critical mobile computing devices, including those using high-speed electronic components. In particular, it is desired that embodiment of these types of cooling solutions account for the constraints imposed by compliance with promulgated standards or other requirements of these mission critical mobile computing devices or other desires including, for example, the desire to make such products less expensive to purchase or manufacturer (such as by using a polymer chassis, etc.), to raise the reliability of such devices, to extend the operating capabilities (for example battery life) of such devices, to reduce the noise level of such devices, etc.

To that end, attention is now directed to apparatuses, systems and methods for effective cooling of electronic components. In particular, embodiments of the present invention are directed to cooling systems for mobile computers that can be effectively used in cases where the mobile computers have a polymer (or other type of) chassis. More specifically, embodiments of the present invention use micro vapor plates to conduct the heat generated by one or more electronic components of a mobile computer to the chassis of the mobile computer such that the heat from the electronic components is conducted into, and spread over, at least a portion of the surface of the chassis. The mobile computer can then be cooled by convection or radiation, providing, in some embodiments, a completely sealed systems with effective cooling and without the problems inherent to fan based (or certain other types of) cooling systems. Additionally, embodiments of such cooling solutions may be effectively utilized with polymer chassis, allowing the chassis of such mobile computers to be reduced in weight while increasing the impact or drop resistance of such chassis.

Specifically, in one embodiment, a mobile computer may comprise one or more electronic components including ASICs, processors, chips, semiconductor devices, batteries, memory devices, etc. (all types of electronic components will be collectively referred to herein as processors) thermally coupled to one or more micro vapor plates (MVP) that are, in turn, thermally coupled to the chassis of the mobile computer such that heat from these processors may be conducted through the MVP into the chassis. Through the radiation of such heat from the chassis the processor(s) may be cooled utilizing convection. By utilizing MVPs numbered, shaped or sized based upon, for example, a number or type of processor(s), a desired operating temperature for the processor(s), the material, construction or design of the chassis, a desired "hot spot" (size, shape, temperature) on the chassis, or almost any number of other desired criteria, an effective cooling solution may be implemented which allows operational or design constraints to be met using, for example, a desired chassis material or design, desired types of processors, etc. In particular, using embodiments of the present invention effective cooling solutions that do not utilize fans and that allow the use of polymer chassis may be implemented in conjunction with the use of relatively high speed processors or other types of PROCESSORs.

Specifically, in certain embodiments a mobile computer may comprise a processor and a memory controller hub (MCH). An MVP may be thermally coupled to the processor and thermally coupled to the chassis of the mobile computer such that heat from the processor is conducted along the MVP and into the chassis. Another MVP may be thermally coupled to the MCH and the chassis such that heat from the MCH is conducted along the MVP and into the chassis. Thus, the processor and MCH can be cooled by natural convection. Furthermore, in one embodiment separate MVPs may be unitized in conjunction with the processor and MCH such that heat from each of the components may be conducted along independent paths into different areas of the chassis, allowing cooling to be achieved more effectively. In certain embodiments it may also be possible to provide an extra level of performance when such mobile computers are in a docked state by conducting heat into the docking station. Metal-to-metal (or other types of conduction) from the mobile computer to the docking station (which may thermally enhanced using one or more cooling techniques) could allow the mobile computer to have even better thermal performance in a docked configuration.

It should be noted that while certain embodiments may be illustrated herein with respect to the cooling of the CPU or MCH of a mobile computers with plastic cases other embodiments may be effectively utilized in conjunction with other types of processors or electronic components, with electronic devices that have other types of cases (e.g. other than plastic), to cool other types of electronic components (e.g. batteries, other to processors, etc.), etc.

Figure 3A:
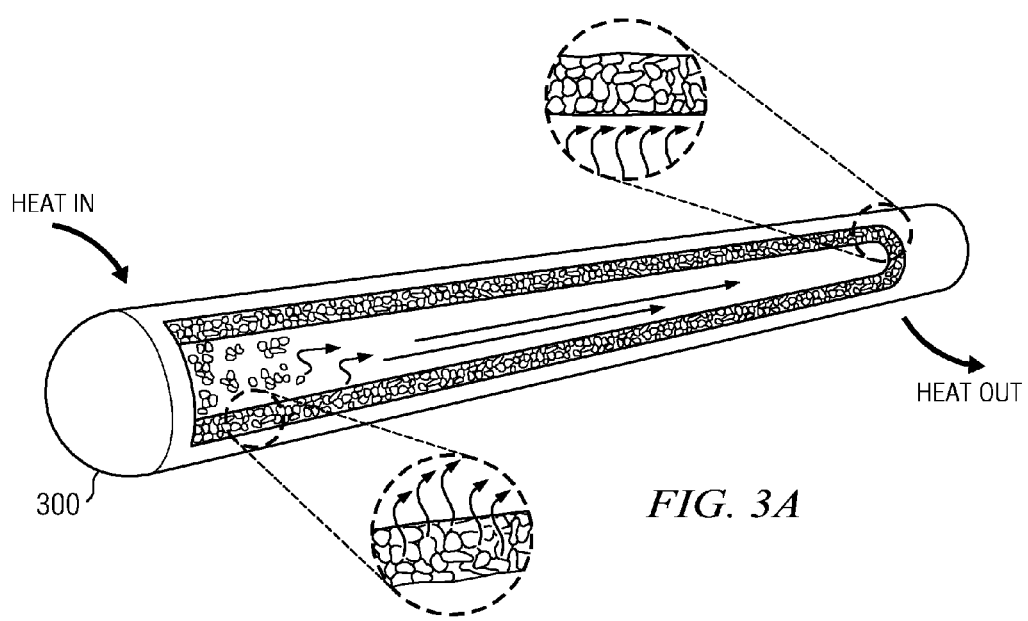
FIG. 3A depicts one embodiment of a heat pipe.

It may be helpful here to briefly discuss MVPs in more detail. Thus, attention is now directed to FIGS. 3A and 3B. FIG. 3A depicts heat pipe 300. A heat pipe 300 is a simple device that can quickly transfer heat from one point to another. They are often referred to as the "superconductors" of heat as they possess an extraordinary heat transfer capacity and rate with almost no heat loss. A heat pipe 300 consists of a sealed aluminum or copper container whose inner surfaces have a capillary wicking material. A heat pipe 300 is similar to a thermosyphon. It may differ from a thermosyphon by virtue of its ability to transport heat against gravity by an evaporation-condensation cycle with the help of porous capillaries that form a wick. The wick provides the capillary driving force to return the condensate to the evaporator. The quality and type of wick usually determines the performance of the heat pipe.

Different types of wicks are used depending on the application for which the heat pipe is being used. The three basic components of a heat pipe are: 1) the container 2) the working fluid and 3) the wick or capillary structure. The choice of the particular container, working fluid and wick or capillary structure may be determined based upon the application in which the heat pipe is to be utilized.

Such heat pipes are configured to transfer heat primary along the axis on which the container is aligned. Inside the container of the heat pipe is a liquid under its own pressure which enters the pores of the capillary material, wetting all internal surfaces. Applying heat at any point along the surface of the heat pipe causes the liquid at that point to boil and enter a vapor state. When that happens, the liquid picks up the latent heat of vaporization. The gas, which then has a higher pressure, moves inside the sealed container to a colder location where it condenses. Thus, the gas gives up the latent heat of vaporization and moves heat from the input to the output end of the heat pipe.

Figure 3B:
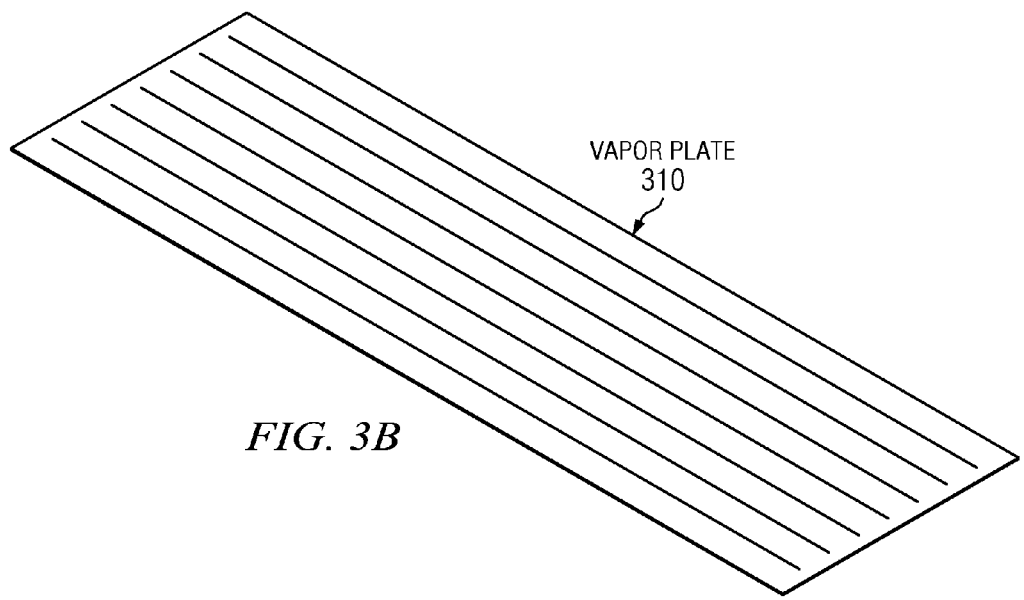
FIG. 3B depicts one embodiment of a micro vapor plate.

Moving now to FIG. 3B, one embodiment of a MVP 310 is depicted. An MVP essentially comprises a set of joined heat pipes and is thus configured to transfer heat primarily along the axis on which the joined heat pipes are aligned. By joining multiple heat pipes into an MVP a number of advantages may be gleaned, including a reduced form factor (some MVPs are around 1.2 mm thick or less), increased thermal conductivity and material advantages (such as the ability to be manufactured using an aluminum container).

In one embodiment, MVP 310 may be made of a set (for example, 12) of a plurality of joined aluminum heat pipes comprising an acetone working fluid where the MVP is 1.2 mm thick and approximately 20 mm wide. Embodiments of such MVPs may, for example, be manufactured by Akust Technology Co. such as MVPs part nos. MVP-1220B125A, MVP-1223A125A, MVP-1630C200A or MVP-2550A150A.

Figure 4:
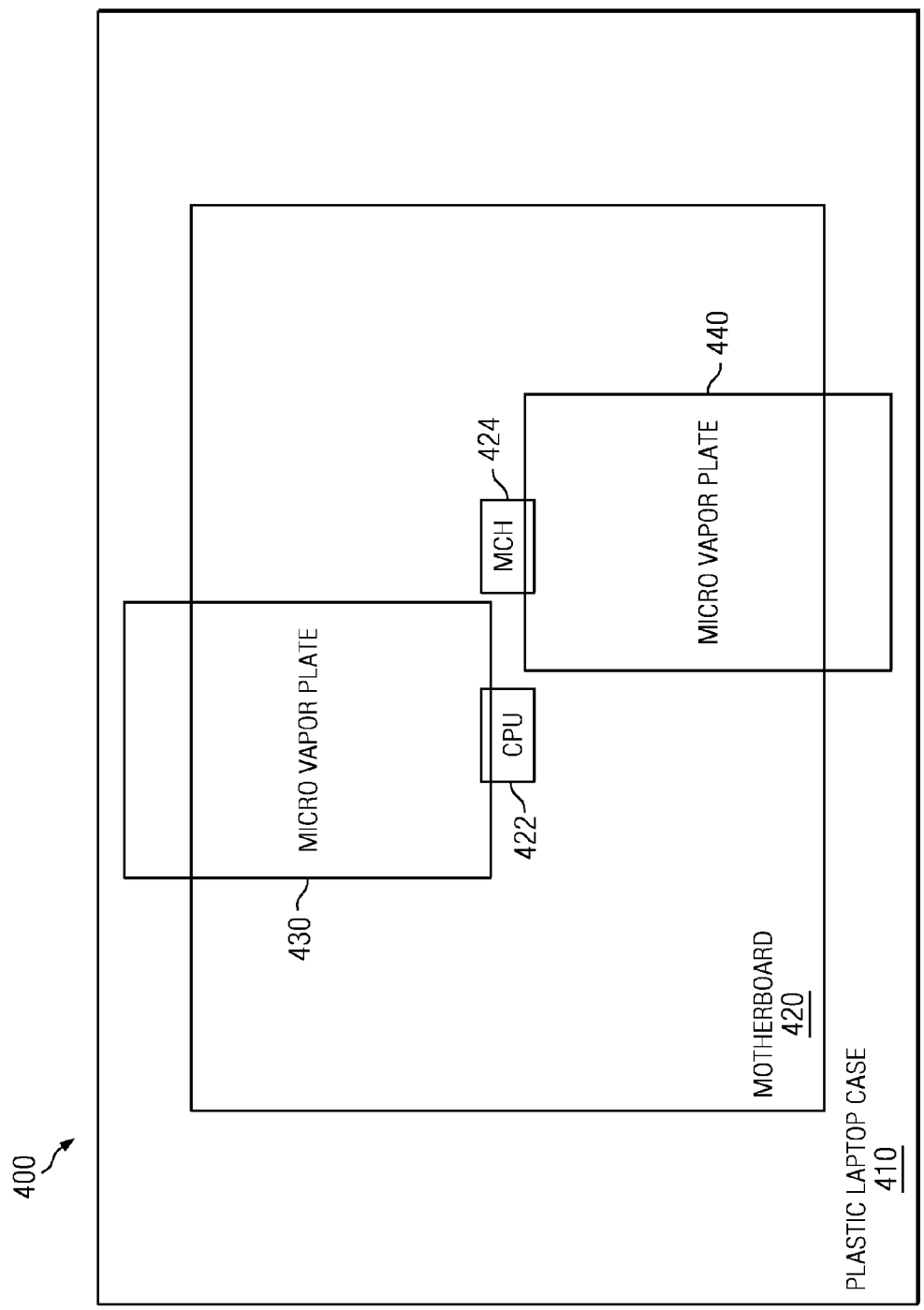
FIG. 4 depicts one embodiment of a cooling solution.

MVPs of this type may be utilized in embodiments of the present invention to effectively cool electronic components of mobile computer devices as discussed above. FIG. 4 depicts one embodiment of the use of MVPs to cool to processors. Here, mobile computer 400 may comprise a case 410 (also referred to herein as a chassis), that may be made of a polymer material or the like. Disposed within the case 410 is an integrated circuit board, such as a motherboard 420 having a processor 422 and a memory controller hub (MCH) 424. In some embodiments, to ensure that effective cooling can be achieved low wattage processors or processors may be utilized, for example those which outputs 20 watts or less. The processor 422 and MCH 424 may be cooled using one or more MVPs thermally coupled to at least one of the processor 422 or MCH 424 and additionally thermally coupled to case 410.

More specifically, in the embodiment depicted a first MVP 430 may be thermally coupled to the CPU 422 of the mobile computer 400 and used to conduct heat to the plastic case 410 while a second MVP 440 may be used to conduct heat from the MCH 424 of the mobile computer 400 to the plastic case 410. These MVPs 430, 440 (which may be of the same or different sizes) may be thermally coupled to an area of the case, such as a bottom (or other area) bezel of the plastic case, or may be exposed externally through the bottom (or other area) bezel of the plastic case of the mobile computer, or may be thermally coupled to heat sinks or other materials which are exposed externally though the case. To further aid in the cooling of mobile computer 400 MVPs 430, 440 may be oriented such that they are configured to conduct heat along the same axis in opposite directions. This allows heat from processors to be conducted into area of the case which are distal from one another.

Figure 5A:
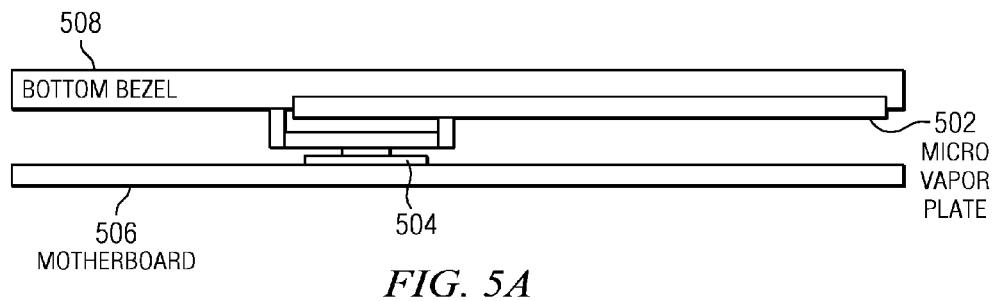
FIGS. 5A and 5B depict embodiments of cooling solutions.

FIG. 5A depicts a cross sectional view of an embodiment where an MVP is coupled to the bottom bezel of a case without being exposed. Here, MVP 502 is thermally coupled to processor 504 on motherboard 506. MVP 502 is thermally coupled to an area (in this case a bottom bezel 508) of the case of the mobile computer without being exposed external to the case of the mobile computer. Accordingly, MVP 502 may conduct heat from the processor 504 on the motherboard 506 into the bezel 508, where the heat is spread over an area of the plastic bezel such that convection can be used to cool the mobile computer, including processor 504.

Figure 5B:
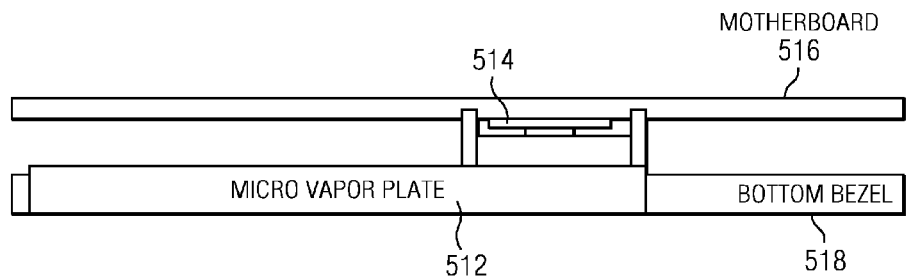

FIG. 5B depicts a cross sectional view of an embodiment where an MVP is exposed through the bottom bezel of a case. Here, MVP 512 is thermally coupled to processor 514 on motherboard 516. MVP 512 is exposed through an area (in this case a bottom bezel 518) of the case of the mobile computer. Accordingly, MVP 512 may conduct heat from the processor 514 on the motherboard 516. The heat may then be conducted directly from the exposed MVP 512 into the environment external to the mobile computer. As the exposed MVP 512 is conducting heat it may be warm or hot to the touch (known as a "hot spot"). Accordingly, it may be desired to protect the exposed portion of the MVP 512 from contact, such as by utilizing bumpers made of rubber or other material to ensure that contact is not accidentally made with the exposed portion of the MVP 512.

Furthermore, in the case where an MVP is exposed through the bottom of the casing it may be need to be robust to avoid damage. Thus, the portion of the MVP which is exposed may be made thicker, or could be made thicker (than another portion of the MVP) by bonding a separate plate to the MVP such that one or more faces of this separate plate (which is bonded to the MVP) may be exposed through the casing. Such a plate may be, for example, a single monolithic piece of aluminum or the like. Further enhancements may be provided in conjunction with this separate plate or thicker area, by for example, providing fins on this plate to enhance cooling, etc.

Figure 6A:
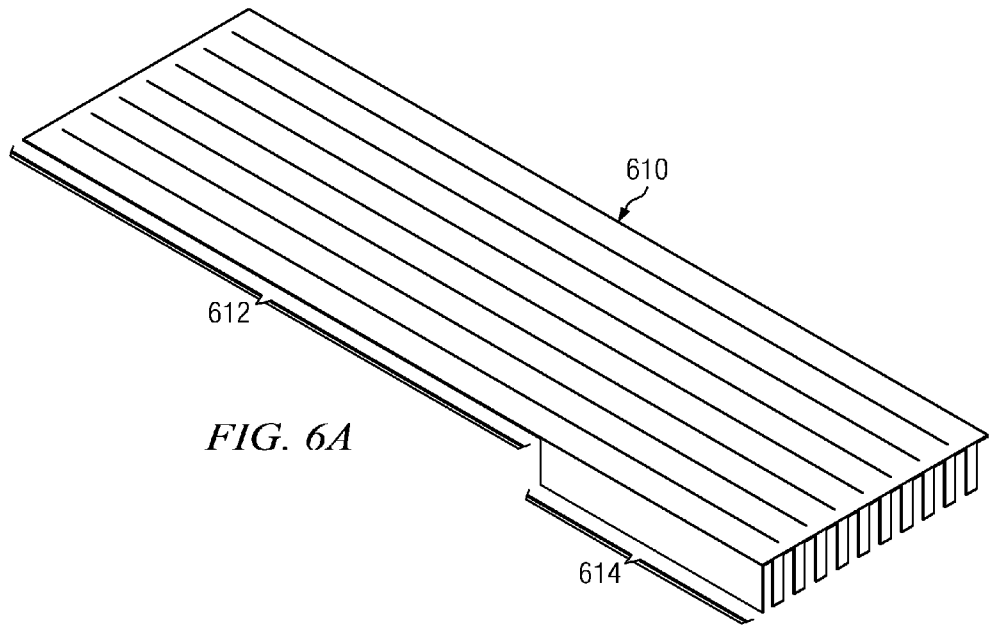
FIGS. 6A, 6B and 6C depict embodiments of micro vapor plates.
Figures 6B, 6C:
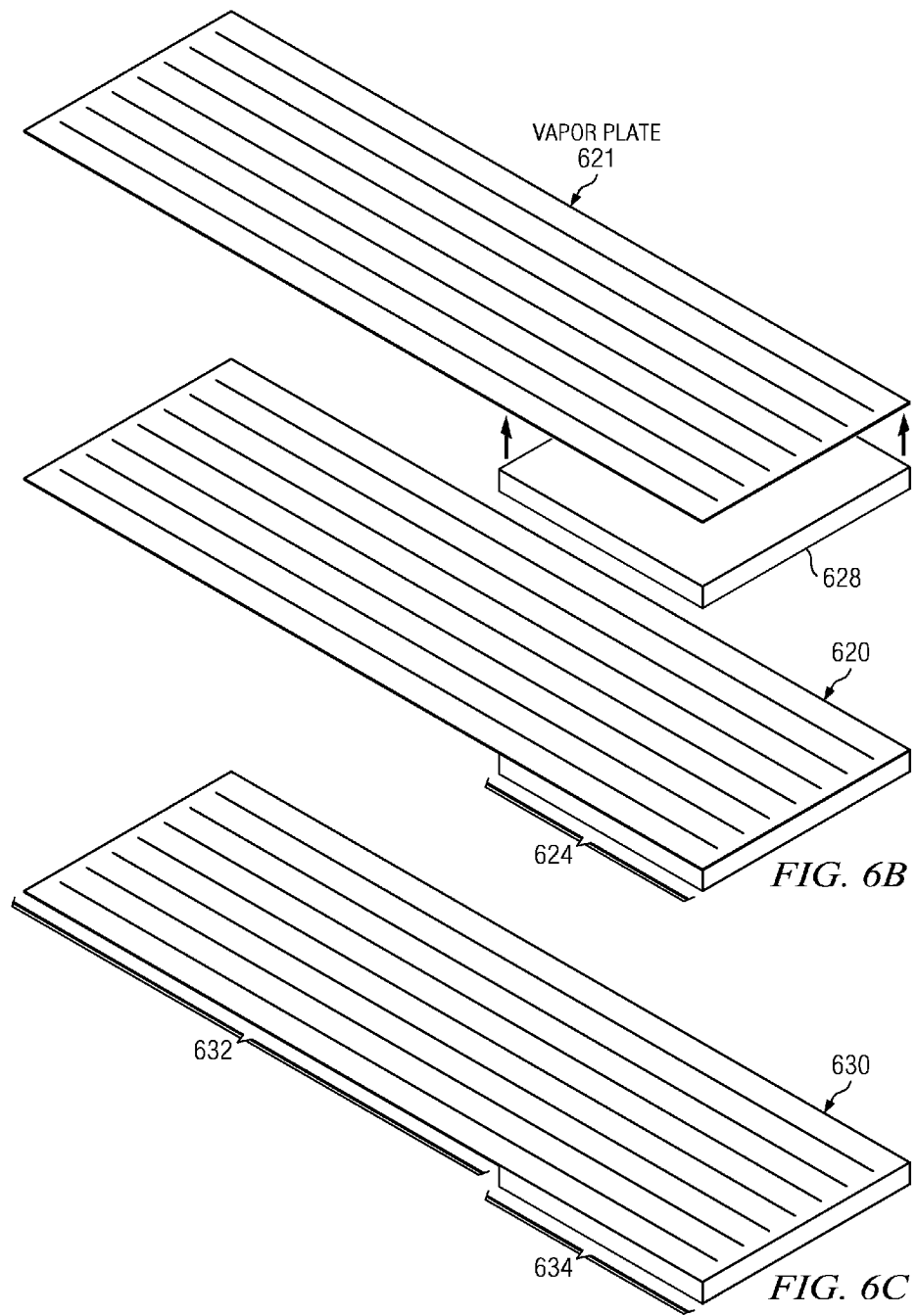

Embodiments of such MVPs with thicker portions or separate plates are depicted in FIGS. 6A, 6B and 6C. Moving first to FIG. 6A, one embodiment of an MVP which may be utilized in conjunction with certain embodiments is depicted. MVP 610 may comprise a thinner portion 612 and a thicker portion 614. When utilized in conjunction with embodiments depicted herein, at least one surface of thicker portion 614 may be exposed outside the case of a mobile computer. This thicker portion 614 may be formed in conjunction with the MVP 610 during, for example, an extrusion process or may be joined to an already formed MVP utilizing for example a thermal bonding material. Furthermore, the exposed surface of thicker portion 614 may be configured to enhance its heat conduction properties, by, for example, forming at least a portion of the exposed surface as a set of fins.

In FIG. 6B another embodiment of an MVP which may be utilized in conjunction with certain embodiments is depicted. Here, thicker portion 624 of MVP 620 may be formed by bonding metal plate 628 to an already formed MVP 621 using a thermal bonding material such as the Thermally Conductive Adhesive Transfer Tape product number(s) 8805, 8810, 8815 or 8820 manufactured by 3M.

FIG. 6C depicts an embodiment of an MVP 630 which has been formed by extruding thicker portion 634 during formation of the MVP 630 itself such that the MVP comprising thinner portion 632 and thicker portion 634 is formed as a single piece.

Referring briefly back to FIG. 4, it will be noted that to more effectively cool the CPU and MCH in mobile computer 400 the heat from these processor(s) may be conducted into different portions of the case, or in different directions. However, certain packaging restrictions may be imposed by a desired form factor for a mobile computing device (for example, it may be that it is desired that the case mobile computer not be greater than a certain height, width or length, etc.). Other restrictions may be imposed by the manufacturer or provider of the MVPs, or limitations of the MVPs themselves. For example, MVPs may be produced in only certain widths (e.g. 20 mm, etc.), lengths or thicknesses (e.g. 1.2 mm, etc.).

One particular limitation is imposed by the design of MVPs themselves. Recall from the above discussion that MVPs are configured to transport heat primarily along a single axis of orientation. However, as it may be desired to maintain a reduced form factor with respect to the cases of mobile computer, these cases may present an impediment to the conduction of heat from a processor, as they may limit the distance that heat can be conducted from a processor along a single axis.

Accordingly, in order to achieve a specification or maximum temperature for a mobile computer or its processors in certain temperature environments or in conjunction with certain other constraints, the MVPs associated with an electronic component may be oriented along two axes. The term "L" shaped will be used herein to refer to an MVP which has portions oriented along different axes. Though embodiments discussed may refer to MVP having portions oriented along two axes which are substantially perpendicular, it will be understood that the term "L" shaped as used herein is more general and will refer to an MVP which has two or more portions oriented along any different axes no matter the angle between these axes.

Figure 7:
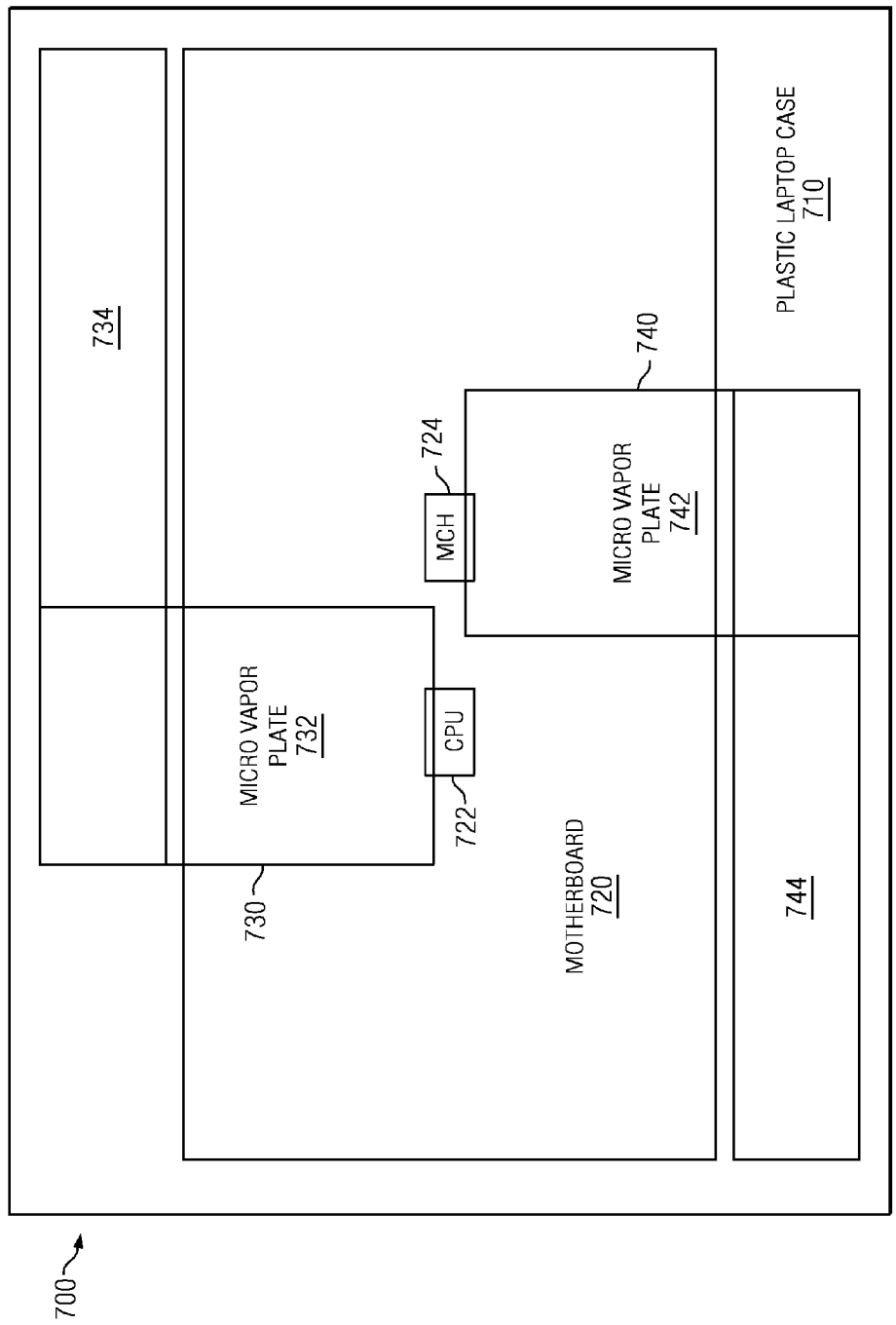
FIG. 7 depicts one embodiment of a cooling solution.
Figure 15:
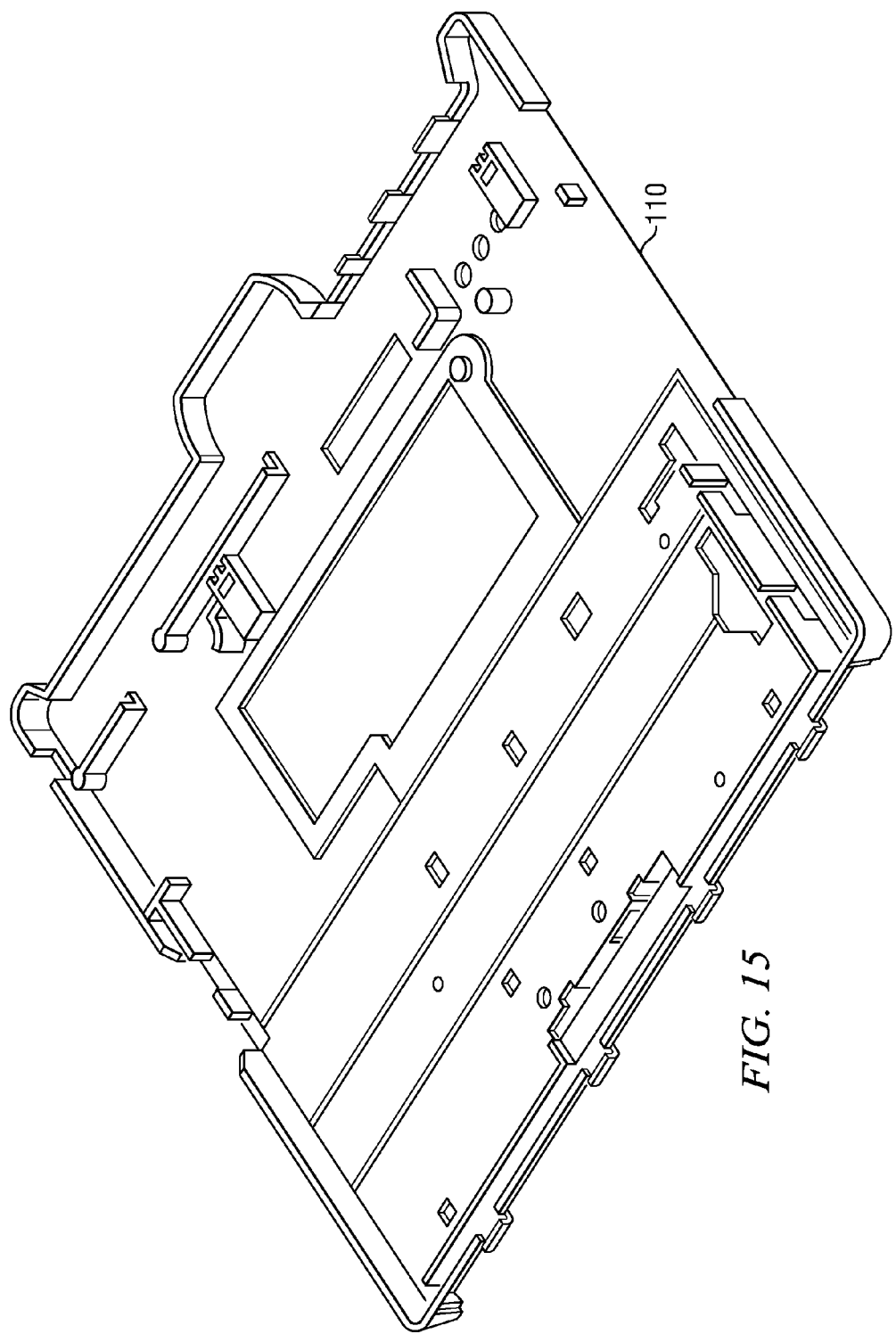
FIG. 15 depicts a chassis for use in one embodiment of a cooling solution.

One embodiment of this type is illustrated in FIG. 7. Mobile computer 700 may comprise a polymer case (also referred to herein as a chassis). One embodiment of such a chassis is depicted in FIG. 15. Returning to FIG. 7, disposed within the case 710 is a motherboard 720 having a processor 722 and a MCH 724. The processor 722 and MCH 724 may be cooled using one or more MVPs thermally coupled to at least one of the processor 722 or MCH 724, where one or more of the MVPs may comprise portions oriented along differing axis and configured to conduct heat along these different axis.

More specifically, in the embodiment depicted a first MVP 730 may be thermally coupled to the CPU 722 of the mobile computer 700 and used to conduct heat to the plastic case 710 while a second MVP 740 may be used to conduct heat from the MCH 724 of the mobile computer 700 to the plastic case 710. These MVPs 730, 740 may be thermally coupled to a portion of the case, such as a bottom (or other area) bezel of the plastic case, or may be exposed externally through the bottom (or other area) bezel of the plastic case of the mobile computer, or may be thermally coupled to heat sinks or other materials which are exposed externally though the case.

Notice here, that each MVP has two portions oriented along different axes, and are configured to route heat from their respective electronics into differing areas of the plastic case. Specifically, each of the MVPs may comprise a first portion oriented along a first axis and configured to conduct heat along this axis and a second portion oriented along a second axis and configured to conduct heat along this axis, where a processor may be thermally coupled to one portion such that heat may conducted from the processor into this first portion. The heat can then be conducted through the first portion along the first axis to the second portion which conducts the heat along the second axis. By coupling areas of the first or second portions to the plastic case or exposing areas of the first or second portion through the case conductive cooling may be achieved. Furthermore, as portions of the MVP are oriented along different axis heat may spread among a greater surface area, even given certain space constraint.

As depicted in the embodiment of FIG. 7, MVP 730 may be coupled to the processor 722 of mobile computer 700 and used to cool the processor 722 and the mobile computer 700. MVP 730 comprises two portions, portion 732 and 734. Portion 732 may be coupled to the processor and oriented along a first axis such that portion 732 may be configured to conduct heat from the processor 722 along the first axis. The second portion 734 may be oriented along a second axis substantially perpendicular to the first axis such that portion 734 may be configured to conduct heat along the second axis. Thus, in operation heat may be conducted from the processor 722 into the first portion 732 of the MVP 730, the heat is conducted through the first portions 732 along the first axis and conducted into second portion 734. The heat is then conducted along the second axis by the second portion 734. By coupling one or more areas of the first portion 732 or the second portion 734 of the MVP 730 to the plastic case 710, or exposing one or more areas of a portion 732, 734 external to the case, convective cooling can be used to dissipate the heat and cool the mobile computer.

Similarly, MVP 740 may be coupled to the MCH 724 of mobile computer 700 and used to cool the processor 700 and the mobile computer 700. MVP 740 comprises two portions, portion 742 and 744. Portion 742 may be coupled to the MCH and oriented along a first axis such that portion 742 may be configured to conduct heat from the MCH 724 along the first axis. The second portion 744 may be oriented along a second axis substantially perpendicular to the first axis such that portion 744 may be configured to conduct heat along the second axis. Thus, in operation heat may be conducted from the MCH 724 into the first portion 742 of the MVP 740, the heat is conducted through the first portions 742 along the first axis and conducted into second portion 744. The heat is then conducted along the second axis by the second portion 744. By coupling one or more areas of the first portion 742 or the second portion 744 of the MVP 740 to the plastic case 710, or exposing one or more areas of a portion 742, 744 external to the case, convective cooling can be used to dissipate the heat and cool the mobile computer.

To further aid in the cooling of mobile computer 700 MVPs 730, 740 may be oriented such that they are configured to conduct heat to different areas of the case. This allows heat from each processor to be conducted into an area of the case which may be, for example, distant from one another. For example, portions 742, 732 of MVPs 730, 740 may be oriented such that they are configured to conduct heat along a first axis in opposite directions. Similarly, portions 744, 734 of MVPs 730, 740 may be oriented such that they are configured to conduct heat along the second axis substantially perpendicular to the first axis but in opposite directions.

While the use of the "L" shape MVPs may be useful in certain embodiments, in particular those in which space configurations imposed by the dimensions of the case may need to be accounted for, the construction of such "L" MVPs may present an impediment. To illustrate, in certain cases, MVPs may be available in certain thicknesses and certain widths. For example, certain MVPs may be made available in 1.2 mm thickness, and 12 mm, 20 mm, 23 mm and 40 mm widths and any length desired. However, MVPs may not be available in an "L" shape as desired.

Accordingly, in one embodiment, two MVPs may be joined to create an MVP of the desired "L" shape. In one embodiment, then in order to create an MVP of the desired dimension a first MVP may be joined to a second MVP to form an "L" shape MVP, where the first MVP may comprise the first portion of the resulting MVP oriented along a first axis and the second MVP may comprise the second portion of the resulting MVP oriented along the second axis. While the joining of these MVPs to create an "L" shaped MVP may be accomplished in almost any manner desirable, it may be desired to maximize heat transfer between the two MVPs being joined. Thus, a portion of the first MVP which will be oriented along a first axis may be overlapped with a portion of the second MVP which is to be oriented along the second axis, and these overlapping portions of the two MVPs joined using, for example a thermal grease such as Shinetsu X23-7783D (often referred to as a Thermal Interface Material or TIM) or 3M 8810 which is a double sided thermally conductive pressure sensitive adhesive.

However, if the MVPs are overlapped such as described it may be the case that the resulting "L" shaped MVP will be double the thickness of the original MVPs used to make it in the areas where the first and second MVPs have been overlapped. Consequently, in certain embodiments, before the two MVPs are joined a portion of the first MVP to be overlapped (such portions may be referred to herein as overlap portions) will be shaped (for example, flattened) to approximately half its original thickness by applying sufficient pressure to that portion or shaping it in some other manner. Similarly, the portion of the second MVP to be overlapped will also be shaped. When the MVPs are subsequently joined using these respective shaped overlapping portions, the resulting "L" shaped MVP will retain the original thickness of the two MVPs in substantially all areas (including the overlapping portions).

Figure 8:
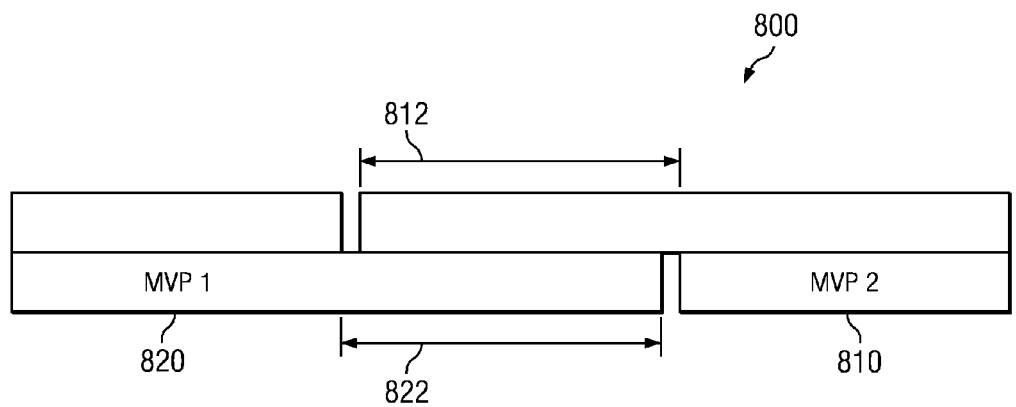
FIG. 8 depicts one embodiment of joining micro vapor plates.

One embodiment of the joining of two MVPs using this methodology is illustrated in FIG. 8. Here, MVP 810 is to be joined with MVP 820 to form "L" shaped MVP 800. MVP 810 has portion 812 which is to be overlapped with portion 822 of MVP 820 to from MVP 800. Thus, before MVP 810 and MVP are joined, portion 812 of MVP 810 may be flattened to substantially half the height of MVP 810 (in this case, portion 810 may be flattened to 0.6 mm) while portion 822 of MVP 820 may be flattened to substantially half the height of MVP 820. The portions 812, 822 of the MVPs 810, 820 can then be joined to make "L" shaped MVP 800 which is substantially the same height in all areas (here, 1.2 mm).

It should be noted here that the particular dimension of each of the MVPs utilized (including each of the component MVPS which may be used to construct these MVPs), may be determined based on the type of MVP utilized, the dimensions and material of the case with which they are being utilized, the maximum power of the processors (such as the CPU or MCH power), the desired temperature for the components, system, case temperature, etc., including any specified maximum or average temperature in a particular ambient temperature, etc. For example, referring to FIG. 7, in one embodiment with a mobile computer having a base with dimensions 12.5×10.0×1.0 inches, a CPU with a max CPU power of 10 Watts and an MCH having a maximum power of 7 w the dimensions of MVP 742 coupled to the MCH may be 20×150 X1.2 mm while the MVP 744 overlapped and coupled to MVP 742 may be 20×100×1.2 mm while MVP 732 coupled to the CPU is 20×115×1.2 mm while MVP 734 overlapped and coupled to MVP 732 is 20×125×1.2 mm.

Figure 16A:
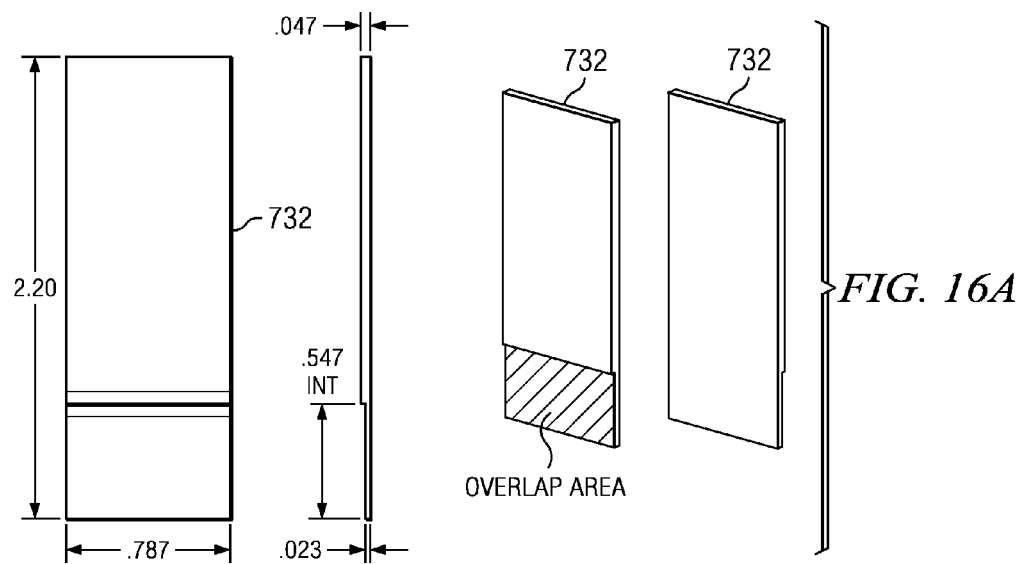
FIGS. 16A-16D depict one embodiment of a cooling solution.
Figure 16B:
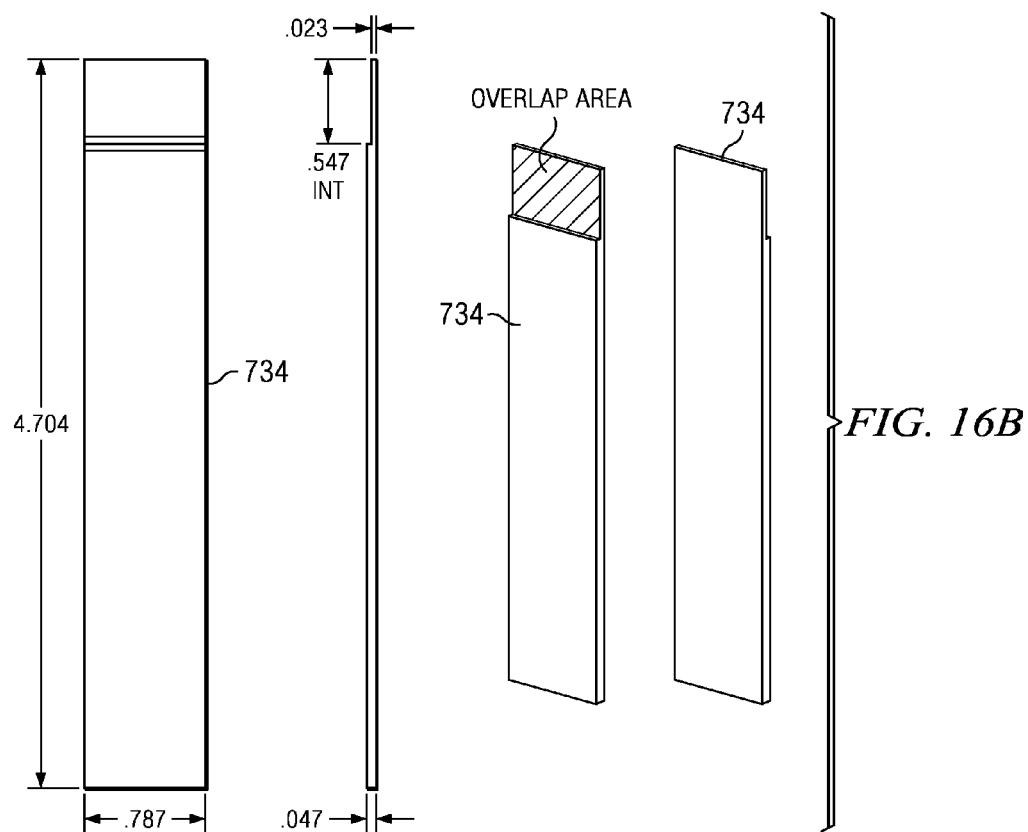
Figure 16C:
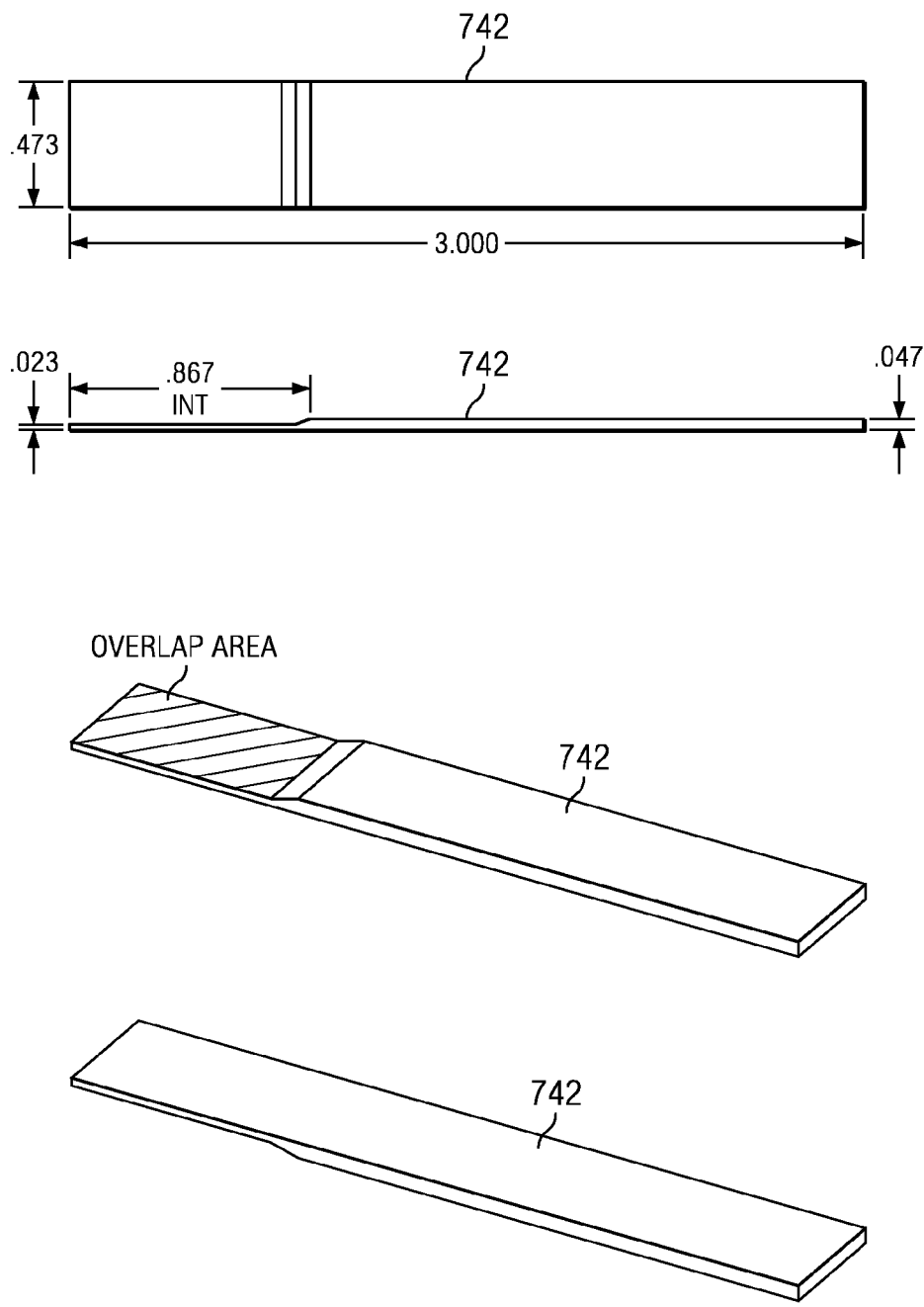
Figure 16D:
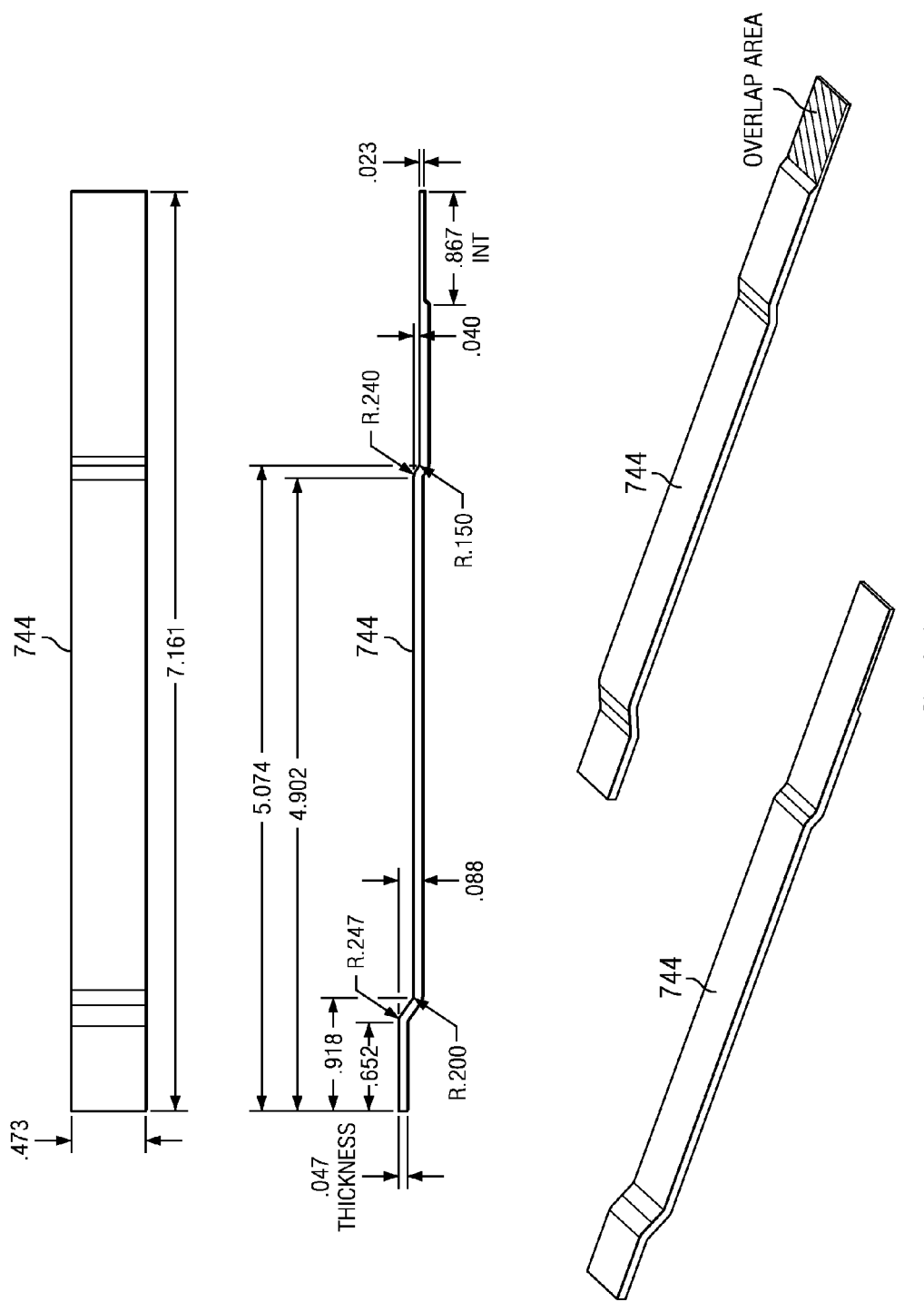

Other dimensions are possible. FIGS. 16A-16D depict embodiments of MVPs which may be utilized in conjunction with embodiments configured similarly to FIG. 7 and utilizing an Intel® Core™ 2 Duo SU9600 w/VT (1.6 GHz, 3M L2Cache, 800 MHz FSB) as a CPU and a corresponding MCH. More specifically, in certain embodiments, FIG. 16A depicts an embodiment of an MVP which may coupled to the CPU be utilized as MVP 732. FIG. 16B depicts an embodiment of an MVP which may be coupled to the MVP depicted in FIG. 16A and function as MVP 734. FIG. 16C depicts an embodiment of an MVP which may be coupled to the MCH and utilized as MVP 742 while FIG. 16D depicts an embodiment of an MVP which may be coupled to the MVP depicted in FIG. 16C and function as MVP 744.

Figure 9A:
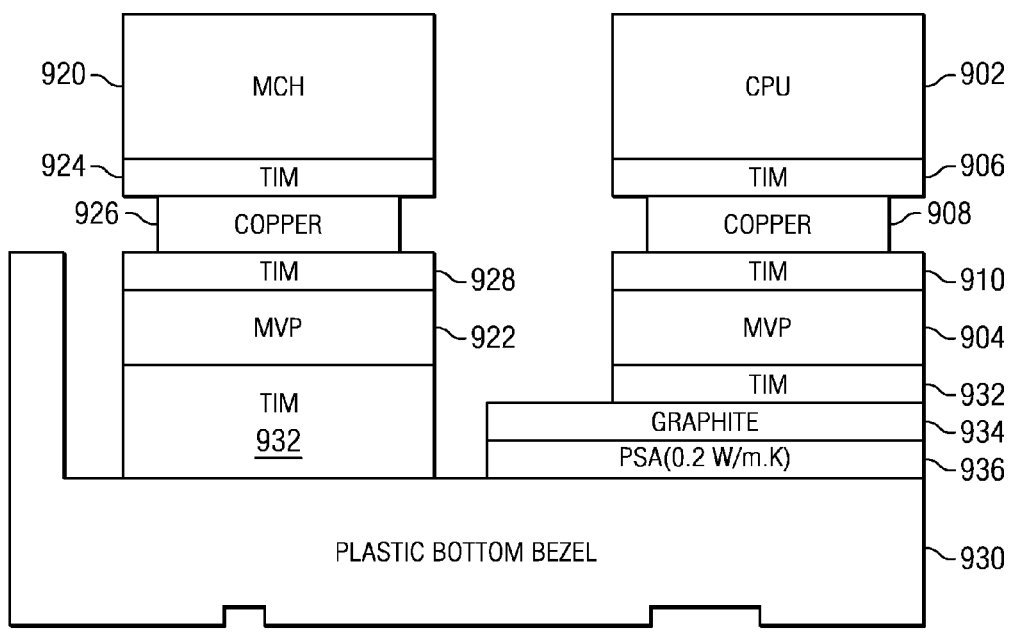
FIGS. 9A-9C depict embodiments of constructions for cooling solutions.
Figure 9B:
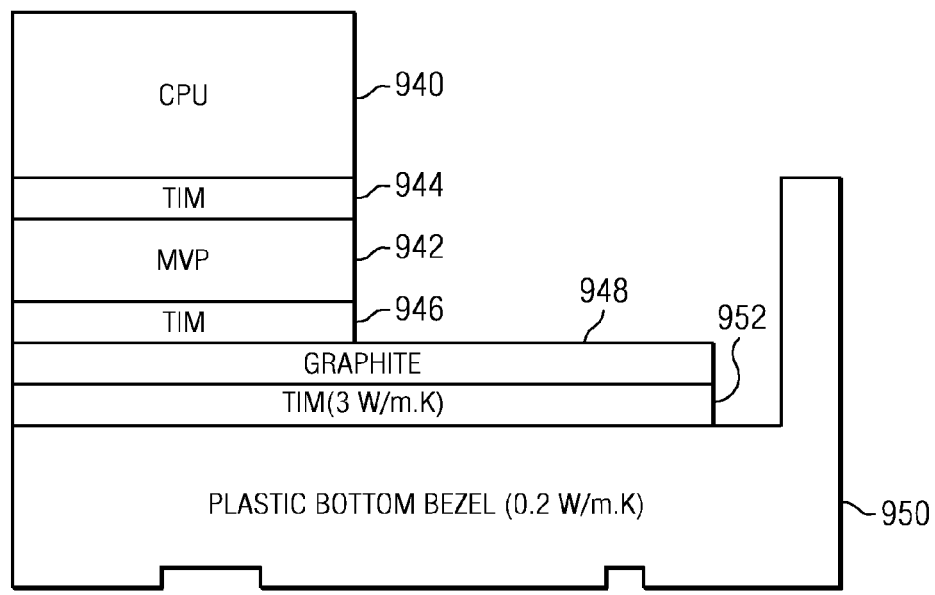
Figure 9C:
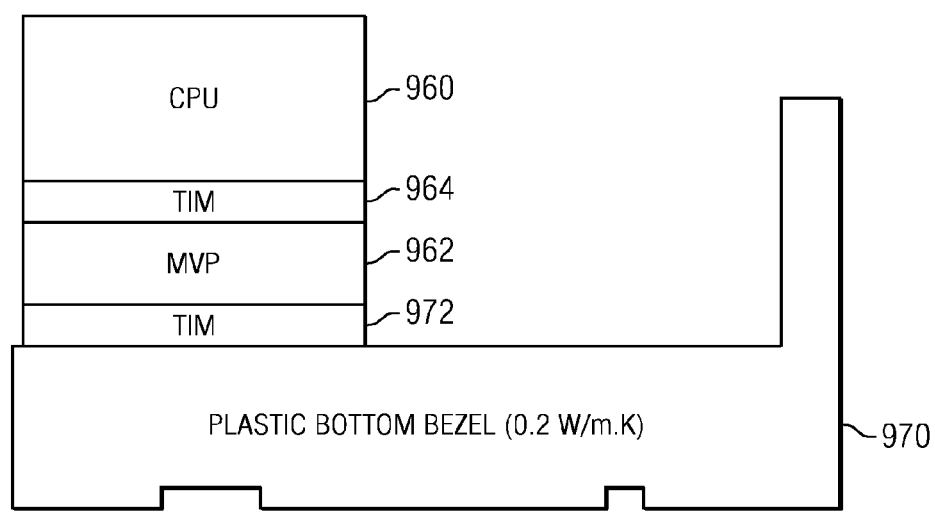

While embodiments of the present invention described above are effective cooling solutions, in some embodiments it may be desired to aid the dispersal of the heat conducted by the MVPs into the casing of the mobile computer. To aid in this dispersal then, in some embodiments, a graphite material such as a PGS graphite sheet from Panasonic (for example, Panasonic part numbers EYGS121803, EYGA1218032, EYGA121803K, EYGA182310, EYGA121810M, etc.) or the like may be utilized between the MVPs and the casing of the mobile computer. Referring to FIGS. 9A, 9B and 9C then, three embodiments of the construction of embodiments of the present invention are depicted.

Turning first to FIG. 9A, a cross sectional view of one embodiment of a construction which may be utilized in conjunction with embodiments discussed herein is depicted. In this embodiment, a mobile computer may comprise CPU 902 and an MCH 920. MCH 920 may be thermally coupled to MVP 922 through TIM 924, a copper cap 926 and another layer of TIM 928. MVP 922 is thermally coupled to the plastic case 930 of the mobile computer through another layer of TIM 932. CPU 902 may be thermally coupled to MVP 904 through TIM 906, a copper cap 908 and another layer of TIM 910. MVP 904 is thermally coupled to the plastic case 930 of the mobile computer through another layer of TIM 932, graphite sheet 934 and a pressure sensitive adhesive (PSA) 936 having a thermal conductivity of at least 0.2 W/m·K.

FIG. 9B depicts a cross sectional view of another embodiment of a construction which may be utilized in conjunction with embodiments discussed herein is depicted. In this embodiment, plastic bezel 950 may have a thermal conductivity of 0.2 W/m·K. CPU 940 may be thermally coupled to MVP 942 through TIM 944. MVP 924 is thermally coupled to the plastic case 950 of the mobile computer through another layer of TIM 946, graphite sheet 948 and another layer of TIM 952 having a thermal conductivity of at least 3 W/m·K.

FIG. 9C depicts a cross sectional view of another embodiment of a construction which may be utilized in conjunction with embodiments discussed herein is depicted. In this embodiment, plastic bezel 970 may have a thermal conductivity of 0.2 W/m·K. CPU 960 may be thermally coupled to MVP 962 through TIM 964. MVP 962 is thermally coupled to the plastic case 970 of the mobile computer through another layer of TIM 972.

Figure 10:
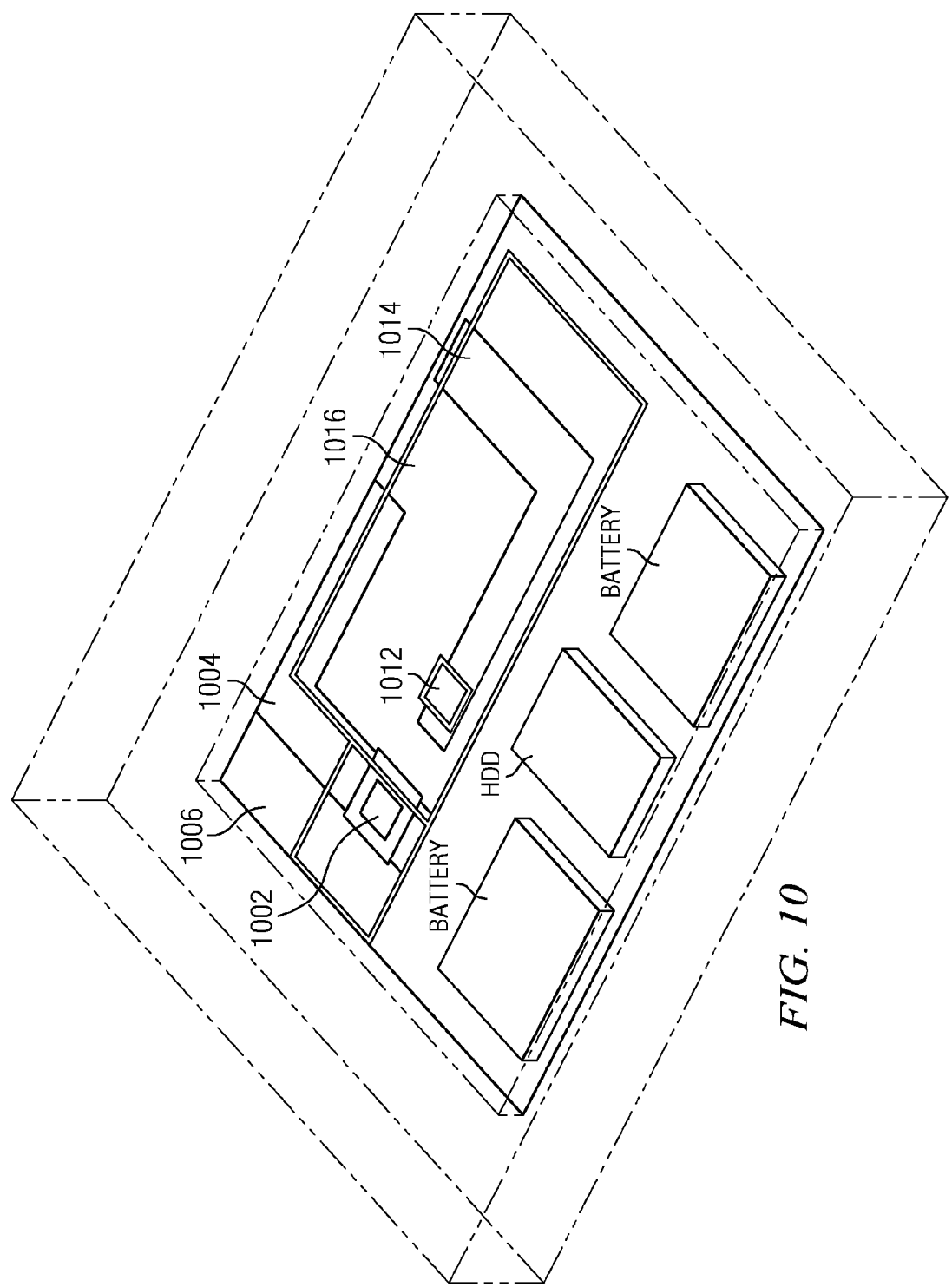
FIG. 10 depicts one embodiment of an IcePak model of one embodiment of a cooling solution.

It may be helpful here to illustrate the efficacy of embodiments of the present invention discussed herein. Referring to FIG. 10 an IcePak model of one particular embodiment of the present invention is depicted. Here, the CPU 1002 is being cooled using MVP 1004 with 0.1 mm thick TIM between the MVP 1004 and the CPU 1002, a graphite sheet 1006 between the MVP 1004 and the bottom of the case and a TIM between the graphite sheet 1006 and the bottom of the case. Similarly, the MCH 1012 is being cooled using MVP 1014 with 0.1 mm thick TIM between the MCH 1012 and the MVP 1014, a graphite sheet 1016 between the MCH 1012 and the bottom of the case and a TIM between the graphite sheet 1016 and the bottom of the case. Thus, the construction is similar to that depicted in FIG. 9B.

Figure 11:
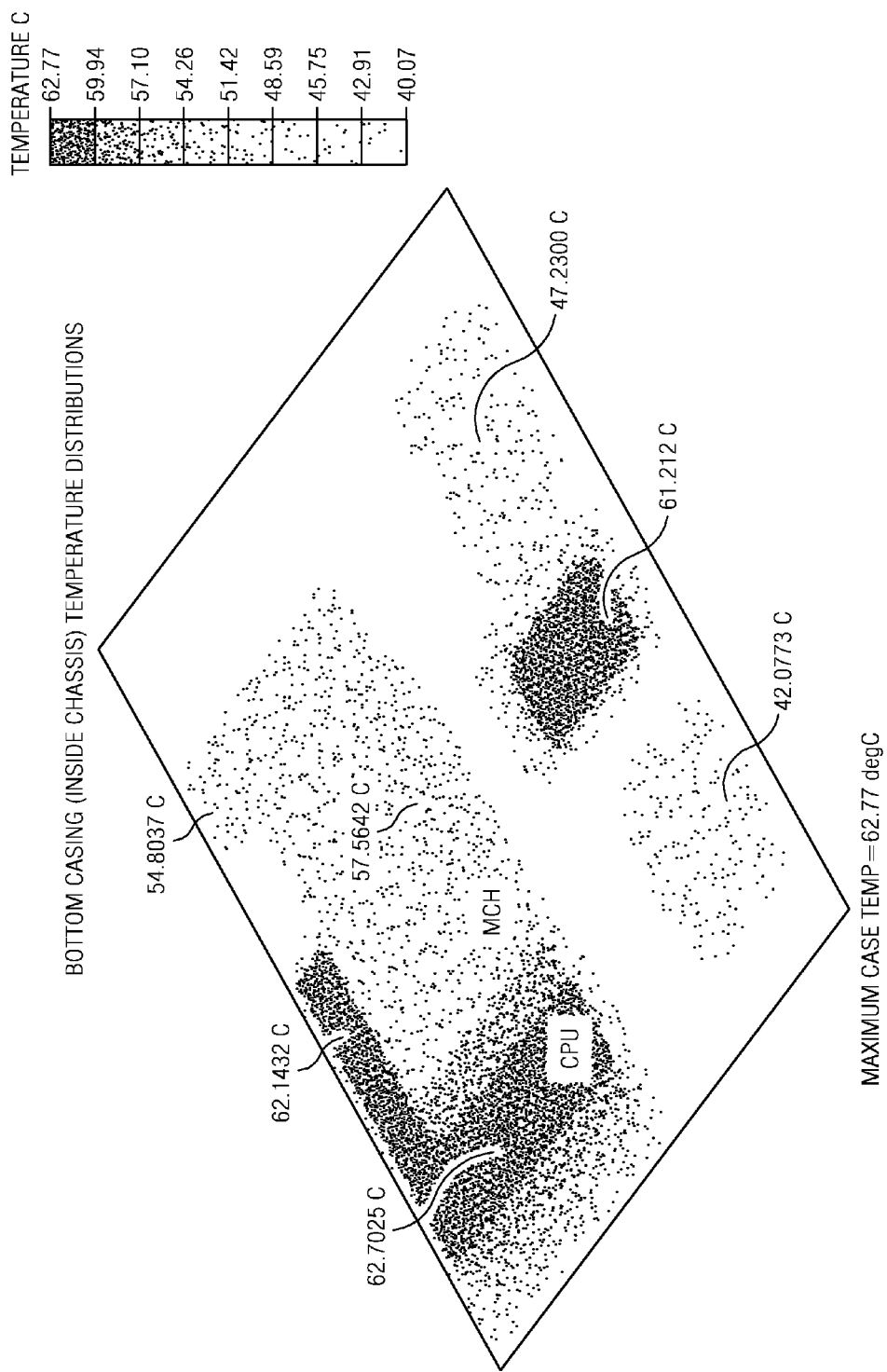

FIG. 11 depicts the temperature distributions resulting from the IcePak model depicted in FIG. 10. As can be seen the maximum case temperature in this particular scenario is 62.77 degrees Celsius. Other proof of the efficacy of embodiments of the present invention may be obtained through reference to FIGS. 12-14.

More specifically, FIG. 12 depicts a prediction of the temperature of various components of a mobile computer employing various embodiments of the present invention in various ambient temperatures.

Figure 13:
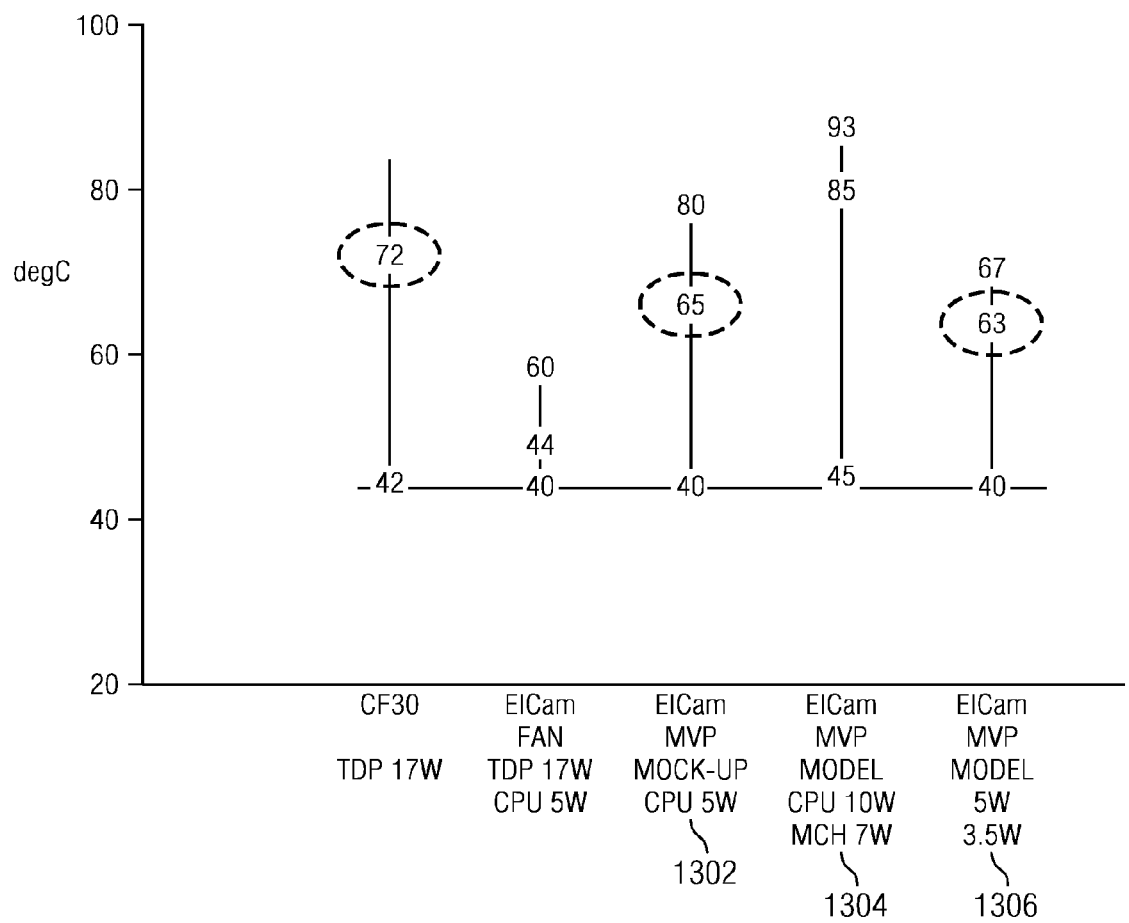

FIG. 13 depicts measured case temperatures 1302, 1304, 1306 of, respectively, an actual mocked-up version of a mobile computer constructed according to FIG. 9A with a CPU having a CPU of 5 Watts, a first mobile computer having a CPU of 10 Watts and a MCH of 7 Watts simulated according to the construction of FIG. 9B and a second mobile computer having a CPU of 5 Watts and a MCH of 3.5 Watts simulated according to the construction of FIG. 9B.

Figure 14:
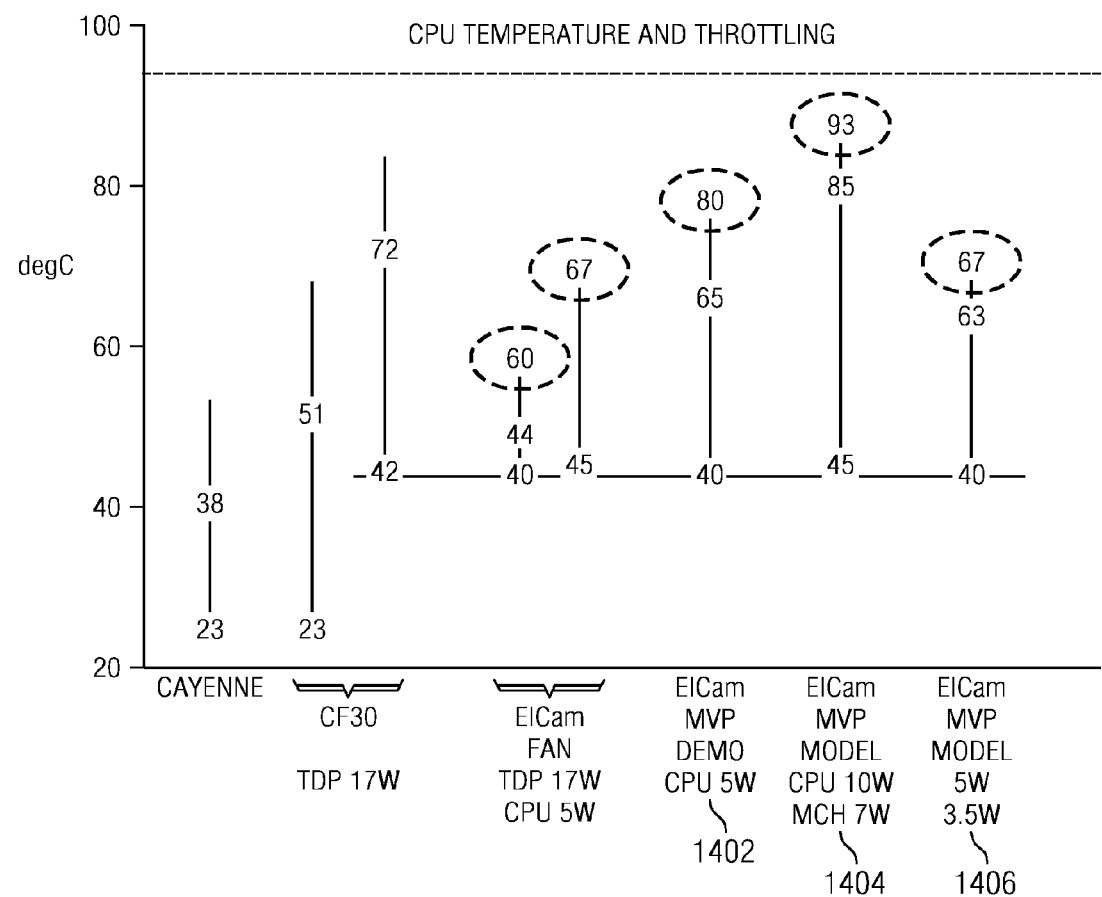

FIG. 14 depicts measured CPU temperatures 1402, 1404, 1406 of, respectively, an actual mocked-up version of a mobile computer constructed according to FIG. 9A with a CPU operating at 5 Watts, a first mobile computer having a CPU operating at 10 Watts and a MCH operating at 7 Watts simulated according to the construction of FIG. 9B and a second mobile computer having a CPU operating at 5 Watts and a MCH operating at 3.5 Watts simulated according to the construction of FIG. 9B.

It will be noted that the above description are examples only and the construction and configuration of various embodiments of cooling solutions may be determined based upon a wide variety of factors including those factors related to the context in which the embodiment is to be deployed such as the type of printed circuit board with which a cooling solution is to be utilized, type of, or factors associated with the electronic components to be cooled, chassis size, size of chamber, size and construction of MVPs, desired strength to weight ratio, ease of fabrication, including welding, machineability and ductility, size and operational parameters such as desired operating temperature, maximum temperature desired given an ambient temperature (such as 40 degrees Celsius, 50 degrees Celsius, etc.) or any number of other factors which may be taken into account when designing, constructing or manufacturing such a cooling solution.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A mobile computing device, comprising:
a case formed from a polymer;
a first micro vapor plate formed from a plurality of heat pipes, the first micro vapor plate having a first portion and a second portion, the first portion having a first height and thermally coupled with one or more heat generating components, the second portion having a second height less than the first height, wherein the first micro vapor plate is oriented along a first axis and shaped to conduct heat from the one or more heat generating components to a first area of the case; and
a second micro vapor plate formed from a plurality of heat pipes, the second micro vapor plate having a third portion and a fourth portion, the third portion having a third height less than the first height of the first micro vapor plate, the fourth portion having a fourth height substantially equal to the first height and thermally coupled with the case,
wherein the second portion of the first plate and the third portion of the second plate are coupled to form an overlapping portion, wherein the height of the overlapping portion is substantially equal to the first height,
wherein the second micro vapor plate is oriented along a second axis substantially perpendicular to the first axis and shaped to conduct heat from the second portion of the first micro vapor plate to a second area of the case.

2. The mobile computing device of claim 1, wherein the one or more heat generating components comprises a processor.

3. The mobile computing device of claim 1, wherein the one or more heat generating components comprises a memory controller hub.

4. The mobile computing device of claim 1, wherein the second height is approximately half the first height.

5. The mobile computing device of claim 4, wherein the first height is approximately 1.2 mm.

6. The mobile computing device of claim 5, wherein the height of the overlapped portion is approximately 1.2 mm.

7. The mobile computing device of claim 1, further comprising a layer of graphite between the fourth portion and the case.

8. The mobile computing device of claim 1, wherein the first portion is thermally coupled with the one or more heat generating components using a pressure sensitive adhesive.

9. The mobile computing device of claim 1, further comprising a layer of thermal interface material (TIM) between one of the one or more heat generating components and the first portion.

10. The mobile computing device of claim 1, wherein the fourth portion forms part of the case.

11. The mobile computing device of claim 1, further comprising a docking station, wherein one or more of the first micro vapor plate and the second micro vapor plate are thermally coupled with the docking station when the mobile computing device is in a docked state, wherein heat is transferred to the docking station by one or more of the first micro vapor plate and the second micro vapor plate.

12. A system for cooling a mobile computing device, comprising:

a plurality of micro vapor plate assemblies, wherein each micro vapor plate assembly comprises:

a first micro vapor plate formed from a plurality of heat pipes, the first micro vapor plate having a first portion and a second portion, the first portion having a first height and thermally coupled with one or more heat generating components, the second portion having a second height less than the first height, wherein the first micro vapor plate is oriented in a plane along a first axis; and a second micro vapor plate formed from a plurality of heat pipes, the second micro vapor plate having a third portion and a fourth portion, the third portion having a third height less than the first height of the first micro vapor plate, the fourth portion having a fourth height substantially equal to the first height and thermally coupled with the case, wherein the second portion of the first plate and the third portion of the second plate are coupled to form an overlapping portion, wherein the height of the overlapping portion is substantially equal to the first height, wherein the second micro vapor plate is oriented in the plane along a second axis substantially perpendicular to the first axis, wherein the first micro vapor plate assembly is configured to conduct heat into a first area of the case and the second micro vapor plate assembly is configured to conduct heat into a second area of the case.

13. The system for cooling a mobile computing device of claim 12, wherein the first micro vapor plate assembly is configured to conduct heat in a first direction and the second micro vapor plate assembly is configured to conduct heat in a second direction.

14. The system for cooling a mobile computing device of claim 12, wherein the first direction is opposite the second direction.

15. The system for cooling a mobile computing device of claim 12, further comprising a docking station, wherein one or more of the first micro vapor plate assembly and the second micro vapor plate assembly are thermally coupled with the docking station when the mobile computing device is in a docked state, wherein heat is transferred to the docking station by one or more of the first micro vapor plate assembly and the second micro vapor plate assembly.

16. The system for cooling a mobile computing device of claim 12, wherein the one or more heat generating components comprises a processor.

17. The system for cooling a mobile computing device of claim 12, wherein the one or more heat generating components comprises a memory controller hub.

18. The system for cooling a mobile computing device of claim 12, wherein the mobile computing device does not include a fan.

19. The system for cooling a mobile computing device of claim 12, wherein the second height is approximately half the first height.

20. The system for cooling a mobile computing device of claim 12, further comprising a layer of graphite between the fourth portion and the case.

21. The system for cooling a mobile computing device of claim 12, further comprising a layer of thermal interface material (TIM) between one of the one or more heat generating components and the first portion.

* * * * *